(12) United States Patent
Hogt et al.

(10) Patent No.: US 6,720,398 B2
(45) Date of Patent: Apr. 13, 2004

(54) USE OF TRIOXEPANS IN THE PROCESS TO MAKE HIGH-SOLID ACRYLIC, STYRENIC, AND LDPE-TYPE RESINS

(75) Inventors: Andreas H. Hogt, Enschede (NL); John Meijer, Deventer (NL)

(73) Assignee: Akzo Nobel N.V., Arnhem (NL)

( * ) Notice: Subject to any disclaimer, the term of this patent is extended or adjusted under 35 U.S.C. 154(b) by 44 days.

(21) Appl. No.: 09/930,403

(22) Filed: Aug. 15, 2001

(65) Prior Publication Data

US 2002/0052455 A1 May 2, 2002

Related U.S. Application Data

(60) Provisional application No. 60/225,313, filed on Aug. 15, 2000.

(30) Foreign Application Priority Data

Jan. 12, 2001 (EP) .............................. 01200100

(51) Int. Cl.$^7$ .................................. C08F 4/32
(52) U.S. Cl. ................. 526/232.5; 526/89; 526/227; 526/232.3; 526/317.1; 526/318; 526/318.1; 526/318.44; 526/319; 526/329.2; 526/352; 526/352.2
(58) Field of Search ................. 526/89, 227, 232.3, 526/232.5, 317.1, 318, 318.1, 318.44, 319, 329.2, 352, 352.2

(56) References Cited

U.S. PATENT DOCUMENTS

| | | | |
|---|---|---|---|
| 3,517,032 A | 6/1970 | Milas et al. | 260/338 |
| 5,387,654 A | 2/1995 | Sanchez et al. | 525/451 |
| 5,399,630 A | 3/1995 | Sanchez | 525/327.6 |
| 5,856,412 A | 1/1999 | Bock et al. | 525/387 |
| 5,907,022 A * | 5/1999 | Stigter et al. | 526/228 |
| 6,566,391 B2 * | 5/2003 | Hogt et al. | 514/450 |

FOREIGN PATENT DOCUMENTS

| | | | |
|---|---|---|---|
| EP | 332386 | 9/1989 | ....... C07C/179/087 |
| WO | 96/27620 | 9/1996 | ............. C08F/4/00 |
| WO | 98/50354 | 11/1998 | ......... C07C/409/00 |
| WO | 00/08072 | 2/2000 | ........... C08F/20/12 |

OTHER PUBLICATIONS

Kirk–Othmer Encyclopedia of Chemical Technology, Third Edition (1982), vol. 17, pp. 27 and 57.

\* cited by examiner

*Primary Examiner*—Tatyana Zalukaeva
(74) *Attorney, Agent, or Firm*—Richard P. Fennelly

(57) ABSTRACT

The invention relates to a polymerization process wherein at least one initiator is selected from trioxepan compounds of formula I

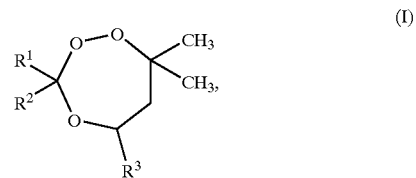

with $R^{1-3}$ being independently selected from substituted or unsubstituted hydrocarbyl groups. Preferably, $R^1$ and $R^3$ are selected from lower alkyl groups, such as methyl, ethyl, and isopropyl, while $R^2$ is preferably selected from methyl, ethyl, isopropyl, isobutyl, amyl, isoamyl, cyclohexyl, $CH_3C(O)CH_2-$, $C_2H_5OC(O)CH_2-$, $HOC(CH_3)_2CH_2-$, and

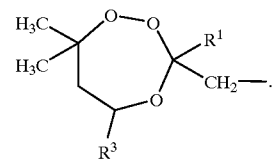

7 Claims, No Drawings

USE OF TRIOXEPANS IN THE PROCESS TO MAKE HIGH-SOLID ACRYLIC, STYRENIC, AND LDPE-TYPE RESINS

This application claims the benefit of Provisional Application No. 60/225,313, filed Aug. 15, 2000.

The present invention relates to the use of trioxepan compounds, or substituted 1,2,4-trioxacycloheptanes, in the process to make acrylic (co)polymers, preferably high-solid acrylic resins, styrenic (co) polymers and/or ethylenic (co) polymers, preferably low-density polyethylene (LDPE).

High-solid acrylic resins are resins that are typically used in coating compositions. For environmental reasons, such coating compositions preferably release as little volatile matter as possible when used. In order to achieve this, resins that contain as little as possible of one or more solvents are needed. In order to be able to handle the coating compositions, particularly when they are to be sprayed, it is typically required that acrylic resin compositions with a low molecular weight be used, so that a low solution viscosity is obtained. In practice, this means that in said coating compositions often use is made of acrylic resins with a low molecular weight and a narrow molecular weight distribution. An example of processes wherein such specific high-solid coating resins are produced can be found in WO 96/27620. In this patent application it is disclosed to use specific cyclic ketone peroxides. Similarly, WO 00/08072 discloses the use of specific dialkyl compounds in order to obtain the high-solid acrylic resins. However, there is a need for further alternative processes. In these alternative processes, preferably use is made of a peroxide that does not need to be phlegmatised, so that the high amount of peroxide that is used does not introduce an undesired solvent, such as solvents that alter the boiling point of the polymerisation medium.

For the production of styrenic resins, styrene is typically (co)polymerised by means of a radically induced process. The radicals can be formed by means of a thermal process wherein it is believed that styrene first dimerises and subsequently forms radicals with a third monomer molecule. However, in order to increase the reactor output and to gain better control over the molecular weight of the polymer, often one or more peroxides are used as a source of free radicals. Typically, a peroxide is sought that generates a polymer with a high molecular weight, compared with polymers produced with other peroxides under similar conditions. Such peroxides can be used in greater amounts, which will increase the polymerisation rate with an attendant reduction of the molecular weight of the resin. Hence, the same polymer as before can be produced at an increased polymerisation rate, leading to an increased reactor space-time yield. For this reason, difunctional peroxides, peroxides with two peroxygen bonds in one molecule, or peroxides that cause controlled cross-linking are considered for use or being used in conventional styrene polymerisation processes. However, alternative polymerisation systems, preferably ones that allow the reactor space-time yield to be increased even further, are still desired. To avoid undesired contamination of the final resin, it is preferred that the alternative peroxides contain less than 25% by weight, more preferably, less than 20% by weight, even more preferably less than 10% by weight of a phlegmatiser, based on the weight of the final formulation. Depending on the situation, it may be most preferred to have a peroxide formulation that is essentially phlegmatizer free.

Similarly, there is a need for a peroxide-initiated process wherein ethylene (co)polymers are produced that have a reduced level of phlegmatiser and/or which makes use of highly efficient peroxides.

The present invention relates to alternative processes wherein a new specific type of peroxide is used. In these processes, it was found that the molecular weight of the resulting resin could be accurately controlled, that the polymer yield was very high, and that some processes led to a colourless product. More particularly, the present invention relates to a process wherein monomers are polymerised using at least one initiator selected from trioxepan compounds of formula I

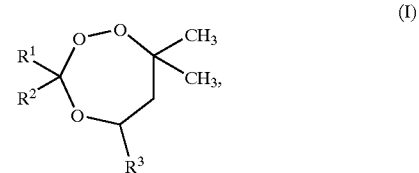

with $R^{1-3}$ being independently selected from hydrogen and substituted or unsubstituted hydrocarbyl groups, while two of the groups $R^{1-3}$ may be linked to form a ring structure. Preferably, $R^{1-3}$ are independently selected from the group consisting of hydrogen and substituted or unsubstituted $C_1$–$C_{20}$ alkyl, $C_3$–$C_{20}$ cycloalkyl, $C_6$–$C_{20}$ aryl, $C_7$–$C_{20}$ aralkyl, and $C_7$–$C_{20}$ alkaryl, which groups may include linear or branched alkyl moieties, while two of the groups $R^{1-3}$ may be connected to form a (substituted) cycloalkyl ring; the optional one or more substituents on each of $R^1$–$R^3$ being selected from the group consisting of hydroxy, alkoxy, linear or branched alk(en)yl, aryloxy, halogen, carboxylic acid, ester, carboxy, nitrile, and amido. Preferably, $R^1$ and $R^3$ are selected from lower alkyl groups, such as methyl, ethyl, and isopropyl, methyl and ethyl being most preferred. $R^2$ is preferably selected from hydrogen, methyl, ethyl, iso-propyl, iso-butyl, tert-butyl, amyl, iso-amyl, cyclohexyl, phenyl, $CH_3C(O)CH_2$—, $C_2H_5OC(O)CH_2$—, $HOC(CH_3)_2CH_2$—, and

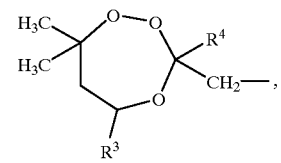

wherein $R^4$ is independently selected from any of the group of compounds given for $R^{1-3}$. Another preferred product is

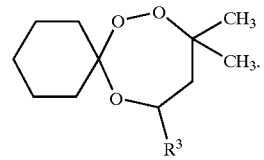

A first group of preferred processes according to the invention are the polymerisation processes to make high-solid acrylate resins. These processes are of the conventional type, for example in bulk, suspension, emulsion or solution, except that at least one peroxide as described above is used. Preferably, use is made of a solution polymerisation.

A second group of preferred polymerisation processes according to the invention are the styrene polymerisation processes wherein at least 40% by weight of the monomer is styrene. Such processes include the production of copolymers such as polystyrene acrylonitrile (SAN), and rubber-modified polymers such as methacrylate-butadiene-styrene (MBS) and high-impact polystyrene (HIPS) resins, as is known in the art. The processes can be carried out by mass, suspension, emulsion or solution polymerisation processes as known in the art. Within this second group of processes, mass polymerisation processes, also known as bulk polymerisation processes, and/or suspension/mass processes, wherein first part of the polymerisation is carried out in suspension after which the reaction mixture is transferred to a mass process, are most preferred. In these most preferred processes, typically general-purpose polystyrene (GPPS) and/or HIPS is produced.

A third preferred group of preferred polymerisation processes are the high-pressure polymerisation processes wherein ethylene is (co)polymerised at pressures ranging from 500 to 4,000 bara. In these processes, the unique properties of the peroxides according to the invention are expected to allow very efficient polymerisation reactions with an improved control over the molecular weight of the resulting polyethylene or ethylene copolymer.

Typically, the polymerisation temperature for all of these processes will range from ambient to 400° C., preferably from 40° to 350° C. It is also possible to conduct the polymerisation using a temperature profile, e.g., to perform the initial polymerisation below 100° C. and then elevate the temperature above 100° C. to complete the polymerisation. In solvent polymerisation processes, the polymerisation is often conducted at the reflux temperature of the solvent or mixture of solvents. These variations are all known to the man skilled in the art, who will have no difficulty in selecting the reaction conditions of choice, depending on the particular polymerisation process and the specific radical polymerisation initiator used. However, the trioxepans are pre-eminently suited for use in high-temperature polymerisation processes, particularly those where the temperature is higher than 140° C., more preferably higher than 165° C., where conventional peroxides are too reactive, resulting in poor yields.

Suitable (co)monomers for producing high-solid solvent based coating resins are olefinic or ethylenically unsaturated monomers, for example substituted or unsubstituted vinyl aromatic monomers, including styrene, α-methylstyrene, p-methylstyrene, and halogenated styrenes; divinylbenzene; ethylene; ethylenically unsaturated carboxylic acids and derivatives thereof such as (meth)acrylic acids, (meth)acrylic esters, (meth)acrylic acid, methoxyethyl acrylate, dimethylamino (meth)acrylate, isobutyl methacrylate, lauryl methacrylate, stearic methacrylate, allyl methacrylate, 2-hydroxypropyl (meth)acrylate, methacrylamide, e.g., butyl (meth)acrylate, 2-ethylhexyl (meth)acrylate, 2-ethylhexyl (meth)acrylate, 2-hydroxyethyl (meth)acrylate and glycidyl (meth)acrylate, methyl (meth)acrylate and ethyl (meth)acrylate; ethylenically unsaturated nitriles and amides such as acrylonitrile, methacrylonitrile, and acrylamide; substituted or unsubstituted ethylenically unsaturated monomers such as butadiene, isoprene, and chloroprene; vinyl esters such as vinyl acetate and vinyl propionate and vinyl ester of versatic acid; ethylenically unsaturated dicarboxylic acids and their derivatives including mono- and diesters, anhydrides, and imides, such as maleic anhydride, citraconic anhydride, citraconic acid, itaconic acid, nadic anhydride, maleic acid, fumaric acid, aryl, alkyl, and aralkyl citraconimides and maleimides; vinyl halides such as vinyl chloride and vinylidene chloride; vinyl ethers such as methyl vinyl ether and n-butyl vinyl ether; olefins such as ethylene isobutene and 4-methylpentene; allyl compounds such as (di)allyl esters, for example diallyl phthalates, (di)allyl carbonates, and triallyl (iso)cyanurate. Monomers like methacrylic acid, diethylaminoethyl methacrylate, di-methylaminoethyl methacrylate, tertiary-butylaminoethyl methacrylate, 3-(2-methacryloxyethyl)-2,2-spirocylohexyl oxasolidene, and the like can be used to modify the adhesion properties of the final coating compositions.

Generally, it is required that the high-solid acrylic resins contain chemically active groups (usually hydroxyl or carboxyl functionality) in order to undergo molecular weight build-up and network formation during the final cross-linking (curing) reaction when the coating composition is applied to the surface to be coated. Since melamine or isocyanates are often used as the curing agents, it is typically desired that the high-solid acrylic resin has a hydroxyl content of from about 2 to about 7% by weight (% w/w). To prepare a polymer which has a hydroxyl content of about 2–7 % w/w, a sufficient amount of hydroxyalkyl acrylate or methacrylate is used (normally, 20–40 % w/w of the monomer composition) and/or an initiator is used which introduces such functional groups into the resin. For this reason the use of trioxepan compounds with hydroxy groups may be preferred. However, also other functional groups, such as carboxylic acid, may be used.

Examples of hydroxyalkyl acrylates and methacrylates that can be used to prepare such functional polymers include: 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, and the like. The amount of these functional (co)monomers to be used depends on the desired hydroxyl value of the final resin and on the type of initiator that is used, as will be clear to the man skilled in the art.

Preferred comonomers that can be used to make the high-solid acrylic resins include: methyl (meth)acrylate, ethyl (meth)acrylate, butyl (meth)acrylate, isobutyl (meth)acrylate, hexyl (meth)acrylate, 2-ethylhexyl (meth)acrylate, lauryl (meth)acrylate, propyl (meth)acrylate, isopropyl (meth)acrylate, styrene, para-methyl styrene, (meth)acrylic acid, and vinyl acetate.

The comonomers that can be used in the conventional styrene polymerisation process of the second preferred group of polymerisations are of the conventional type and include monomers like (m)ethyl (meth)acrylate, acrylonitrile, vinyl pyridine, and cross-linking comonomers, such as divinyl benzene and triallyl isocyanurate. As mentioned above, also rubbers can be present during the polymerisation process, with styrene being grafted on this rubber, as in processes to make HIPS, MBS, and acrylonitrile-styrene-butadiene rubber (ABS) resins.

The comonomers that can be used in the third preferred group of polymerisation processes are of the conventional type and include alkenes, like hexene and octene, vinyl acetate, and acrylic acid.

The amount of initiator that is used in any of these processes will vary, depending on the polymerisation temperature, the capacity for removing the heat of polymerisation, the kind(s) of monomer(s) used, and, when applicable, the applied pressure. Usually, from 0.001–25% w/w of initiator, based on the total weight of the monomers, is employed. Preferably, from 0.001–15% w/w of initiator is employed.

Suitable solvents for use in a solvent polymerisation process are, for example, toluene, xylene, tetrahydronaphthalene, ethyl acetate, methoxypropyl acetate, n-butyl acetate, oxo-hexyl acetate, oxo-heptyl acetate, propylene glycol methyl ether acetate, butyl glycol acetate, ethyl ethoxy propionate, acetone, acetyl acetone, methylethyl ketone, methylisobutyl ketone, methyl n-amyl ketone, methylisoamyl ketone, ethyl alcohol, isopropanol, butanol, benzyl alcohol, diacetone alcohol, methoxy propanal, mineral spirits, other aliphatic, cycloaliphatic and/or aromatic hydrocarbons, e.g. Solvesso 100®, esters such as Exxate 700®, ethers, ketones, alcohols, and mixtures thereof, which are conventionally used. It is noted that in mass GPPS and HIPS processes typically ethyl benzene is used as the solvent. Commercially, the primary considerations in the selection of a suitable solvent are cost, toxicity, flammability, volatility, and chain-transfer activity.

It is noted that certain trioxepans are known. See for instance Kirk & Othmer's *Encyclopedia of Chem. Tech.*, $3^{rd}$ Ed, Vol. 17, page 57, disclosing a 1,2,4-trioxacycloheptane of formula

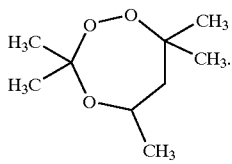

WO 98/50354 discloses four related trioxepan compounds, including the product of formula

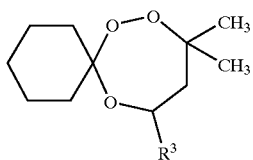

and teaches the use of these compounds together with a co-agent in cross-linking processes. The presently claimed process does not extend to processes where duromers or non-thermoplastic elastomers are formed. The terms are used in their conventional meaning as disclosed in, for instance, Chapter 1.3 of W. Hofmann's *Rubber technology handbook* (Carl Hanser Verlag, 1989).

U.S. Pat. No. 3,517,032 discloses that

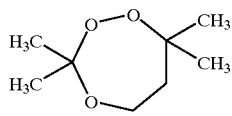

may be formed in a process to make a cyclic trioxide of the formula 4,4,7,7-tetramethyl-1,2,3-trioxyacycloheptane. The cyclic trioxide is said to be useful as a polymerization catalyst. There is no disclosure that the contaminant trioxepan can be used for said purpose.

The trioxepans for use according to the present invention can be synthesised, for example, in a conventional way by reacting $HOC(CH_3)HCH_2C(CH_3)_2OOH$ with a ketone, typically in the presence of a catalyst and followed by purification steps. Such a procedure is disclosed, for instance, in WO 98/50354 (see Example 1).

Suitable ketones for use in the synthesis of the present peroxides include, for example, acetone, acetophenone, methyl-n-amyl ketone, ethylbutyl ketone, ethylpropyl ketone, methylisoamyl ketone, methylheptyl ketone, methylhexyl ketone, ethylamyl ketone, dimethyl ketone, diethyl ketone, dipropyl ketone, methylethyl ketone, methylisobutyl ketone, methylisopropyl ketone, methylpropyl ketone, methyl-t-butyl ketone, isobutyl heptyl ketone, diisobutyl ketone, 2,4-pentanedione, 2,4-hexanedione, 2,4-heptanedione, 3,5-heptanedione, 3,5-octanedione, 5-methyl-2,4-hexanedione, 2,6-dimethyl-3,5-heptanedione, 2,4-octanedione, 5,5-dimethyl-2,4-hexanedione, 6-methyl-2,4-heptanedione, 1-phenyl-1,3-butanedione, 1-phenyl-1,3-pentanedione, 1,3-diphenyl-1,3-propanedione, 1-phenyl-2,4-pentanedione, methylbenzyl ketone, phenylmethyl ketone, phenylethyl ketone, methylchloromethyl ketone, methylbromomethyl ketone, and coupling products thereof. Of course, other ketones having the appropriate R groups corresponding to the peroxides of formula I can be employed, such as compounds of formula HORC(O)ROH, as well as mixtures of two or more different ketones.

Examples of preferred ketones are acetone, methylethyl ketone (any isomer), diethyl ketone (any isomer), methylpropyl ketone (any isomer), methylbutyl ketone (any isomer), methylamyl ketone (any isomer), methylhexyl ketone (any isomer), methylheptyl ketone (any isomer), ethylpropyl ketone (any isomer), ethylbutyl ketone (any isomer), ethylamyl ketone (any isomer), ethylhexyl ketone (any isomer), cyclohexanone, acetyl acetone, ethyl acetoacetate, diacetone alcohol, and mixtures thereof.

The peroxides can be prepared, transported, stored, and applied as such or in the form of powders, granules, pellets, pastilles, flakes, slabs, pastes, and solutions. These formulations may optionally be phlegmatised, as necessary, depending on the particular peroxide and its concentration in the formulation. Preferably the peroxides are used in a form such that at least 50, more preferably at least 75, even more preferably more than 85 percent by weight (% w/w) of the peroxide formulation is one or more of the trioxepans according to the invention. Most preferably the peroxide is used in its technically pure form.

The term "high-solid" is used to denominate resin compositions that contain at least 50 percent by weight (% w/w) of solids (non-volatile matter), based on the total weight of the resin composition. More preferably, they contain more than 60% w/w, most preferably more than 70% w/w of solids.

The term "low molecular weight" is used to denominate (co)polymers with a molecular weight below 50,000, preferably below 25,000, more preferably below 15,000 Dalton.

During the polymerisation processes of the present invention, the usual additives may be employed in conventional amounts. Examples of such additives include chain transfer agents such as thiols, disulphides and/or $CCl_4$.

Coating compositions based on the high-solid acrylic resins as produced according to the invention will comprise the conventional curing agents and can comprise conventional additives, such as stabilisers, surfactants, UV-absorbers, catalyst blockers, anti-oxidants, pigment dispersants, flow additives, rheology control agents, levelling agents, and solvents. Such additives for the coating compositions may be present in the process according to the invention if they do not adversely affect the polymerisation process.

Experimental

Chemicals used:

Styrene ex Merck (distilled before use)
Dichloromethane ex Baker
Solvesso® 100 and Exxate® 700 ex ExxonMobil
Trigonox® 301 ex Akzo Nobel (cyclic methylethyl ketone peroxide 41% in phlegmatiser)
Trigonox® 22 ex Akzo Nobel (1,1-di(tert-butylperoxy) cyclohexane in phlegmatiser)
Trigonox® B ex Akzo Nobel (di-tert.butyl peroxide)

All other chemicals used were supplied by Acros Chemicals, analytical quality, and used without further purification.

Molecular weight (distribution) of polymers was determined in the conventional way using a Waters 510 HPLC pump, the usual columns and detection equipment, and polystyrene standards.

The degree of polymerisation was determined by analysing the amount of unreacted monomer in a conventional way by gas chromatography.

EXAMPLES 1–10 and Comparative Examples A–D

In these examples acrylates are polymerised in a solvent using a jacketed glass reactor with a diameter of 60 mm and a height of 80 mm, equipped with a turbine stirrer, a reflux condenser, and an injection port. Solvent (40 g) was added to the reactor. The temperature was adjusted such that the peroxide used in the experiment has a half life of 15 minutes at said temperature. For polymerisation temperatures up to and including 126° C., butyl acetate was used as the solvent. For polymerisations from 126 up to and including 165° C., Solvesso® 100 was used, Exxate® 700 was used for polymerisations at a temperature from 165–200° C., and ethyinonanoate was used for polymerisations at 220° C.

Nitrogen was used to obtain oxygen-free polymerisation conditions. Monomers (40 g butyl acrylate, 28 g hydroxyethyl methacrylate, 20 g styrene, 10 g methyl methacrylate, and 2 g methacrylic acid) and 30 meq. (30 mmoles for a compound with one OO bond per molecule, 15 mmoles for a compound with two OO bonds per molecule, etc.) initiator were metered into the reactor using a Watson Marlow pump over a 4-hour period. Thereafter the polymerisation was continued for another hour at the same temperature.

The resulting polymer was analysed in a conventional way. The molecular weights were determined by HP-SEC, using polystyrene standards. The solid content (solids) of the resin produced was determined by gravimetric analysis by accurately weighing about 1 g of resin, dissolving this sample in about 10 g of toluene, and subsequently drying in an oven with forced air circulation for 4 hours at 125° C. After cooling of the sample, the weight of the residual material divided by the weight of the original sample is the solid content. The viscosity was measured using a Brookfield viscometer at 25° C.

The reference product "cyclic-MIAKP" was produced on-site using the procedure as given for composition V in WO 96/03397, but using iso-amyl ketone instead of iso-butyl ketone. This compound, as well as the commercial product Trigonox® 301, is considered to be representative of modern high-solid acrylate polymerisation initiators. The cyclic-MIAKP was phlegmatized and contained 67.3% w/w of peroxide. The trioxepans according to the invention were in the technically pure form and contained more than 95% w/w of peroxide. The following products were used:

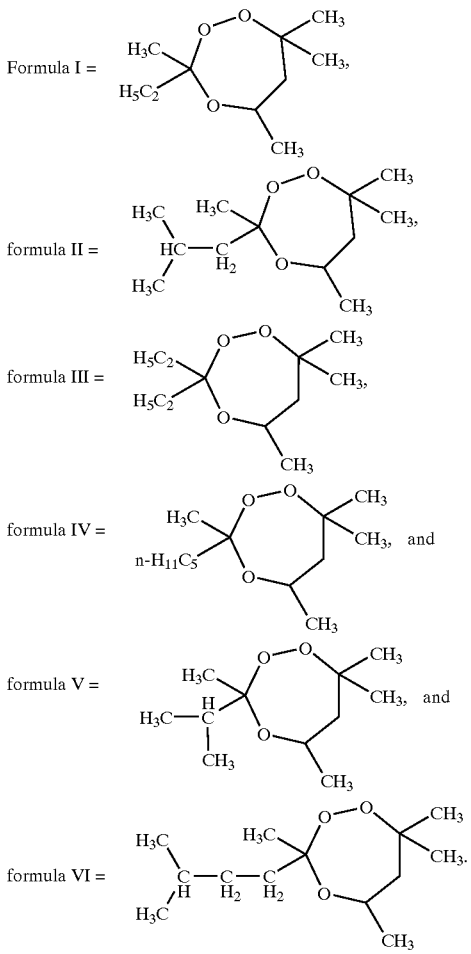

The results are presented below.

| Example | Peroxide | Polymerisation temperature | Solids (%) | Mw | Mn | D |
|---|---|---|---|---|---|---|
| 1 | Formula I | 180 | 69.9 | 4,500 | 1,750 | 2.5 |
| 2 | Formula I | 200 | 70.0 | 2,400 | 1,300 | 1.8 |
| 3 | Formula I | 220 | 69.0 | 1,700 | 1,100 | 1.6 |
| 4 | Formula II | 165 | 69.2 | 5,700 | 2,750 | 2.0 |
| 5 | Formula III | 180 | 70.1 | 3,300 | 1,800 | 1.85 |
| 6 | Formula III | 220 | 69.7 | 1,700 | 1,100 | 1.6 |
| 7 | Formula IV | 180 | 69.5 | 4,000 | 1,950 | 2.04 |
| 8 | Formula IV | 220 | 69.3 | 1,800 | 1,100 | 1,57 |
| 9 | Formula V | 220 | 70.8 | 1,900 | 1,200 | 1.65 |
| 10 | Formula VI | 220 | 68.2 | 1,400 | 1,000 | 1.4 |
| A | cyclic-MIAKP | 180 | 70.8 | 6,000 | 1,900 | 3.1 |
| B | Trigonox ® 301 | 200 | 71.3 | 2,900 | 1,500 | 1.95 |
| C | Trigonox ®B | 220 | 71.1 | 2,000 | 1,200 | 1.66 |
| D | None | 220 | 58.0 | not measured, sticky product | | |

These results show that the trioxepans according to the invention are very efficient initiators for making low-molecular weight, high-solid acrylate resins that have a narrow molecular weight distribution in high yield. Furthermore, these products could be used without phlegmatizers being needed. For reasons unknown the products of examples 7 and 8 gave a colourless resin, while the colour of the other resins varied from slightly to a more distinct yellow.

EXAMPLE 11 and Comparative Example E

Glass ampoules (2.5 ml) were filled with about 1.3 g of the initiator/styrene mixture (0.75 milliequivalent of initiator, being 0.75 mmole in Example 7 and 0.375 mmole in Example C, per 100 g styrene) and placed in dry ice to cool the mixture to about −70° C. The air above the frozen mixture was flushed out with nitrogen and the ampoules were sealed. The ampoules were placed in an oil bath with a temperature of 120° C. to allow the contents to polymerise. Ampoules were taken from the bath after 2, 4, 6, and 8 hours. After removal from the bath, they were cleaned, broken, transferred to a 100 ml conical flask, and the contents were allowed to dissolve for at least 48 hours in 20 ml dichloromethane. The dichloromethane contained 25 g n-butylbenzene and 6.25 g butylated hydroxy toluene per 2500 ml dichloromethane as an internal reference for subsequent GC analysis and anti-oxidant, respectively. After dissolution, the conversion of styrene into polystyrene and the molecular weight of the polystyrene were determined in a conventional way using GC and GPC techniques, respectively.

The following table shows the conversion of styrene and the weight averaged molecular weight (Mw) of the resin as observed after 2, 4, 6, and 8 hours of polymerisation time.

| Example | Peroxide used | Conversion (%) | | | | Mw * 10$^{-3}$ (D) | | | |
|---|---|---|---|---|---|---|---|---|---|
| | | 2 | 4 | 6 | 8 | 2 | 4 | 6 | 8 |
| 11 | Formula V | 36.2 | 69.3 | 94.4 | 99.4 | 320 | 375 | 455 | 445 |
| E | Trigonox ® 22 | 78 | 97.5 | 99.5 | 99.7 | 315 | 370 | 365 | 355 |

EXAMPLE 12 and Comparative Example F

In Examples 12 and F the experiments of examples 11 and E were repeated, but the polymerisation was conducted at 140° C.

From examples 11, 12, E, and F it follows that the product according to the invention gives very high yields of polystyrene and desirable higher molecular weight at equal conversion when compared with a conventional peroxide such as Trigonox® 22.

We claim:

1. A process wherein one or more monomers are polymerised using at least one initiator selected from trioxepane compounds of formula I

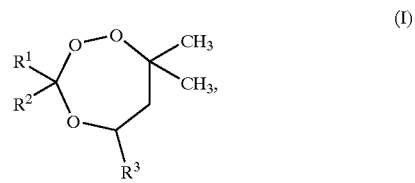

with $R^{1-3}$ being independently selected from hydrogen and substituted or unsubstituted hydrocarbyl groups, while two of the groups $R^{1-3}$ optionally are linked to form a ring structure.

2. A process according to claim 1 wherein $R^{1-3}$ are independently selected from the group consisting of hydrogen and substituted or unsubstituted $C_1$–$C_{20}$ alkyl, $C_3$–$C_{20}$ cycloalkyl, $C_6$–$C_{20}$ aryl, $C_7$–$C_{20}$ aralkyl, and $C_7$–$C_{20}$ alkaryl, which groups may include linear or branched alkyl moieties, while two of the groups $R^{1-3}$ optionally are connected to form a cycloalkyl ring; the optional one or more substituents on each of $R^1$–$R^3$ being selected from the group consisting of hydroxy, alkoxy, carboxylic acid, linear or branched alkenyl, aryloxy, halogen, ester, carboxy, nitrile, and amido.

3. A process according to claim 2 wherein $R^1$ and $R^3$ are selected from lower alkyl groups and $R^2$ is selected from hydrogen, methyl, ethyl, isopropyl, iso-butyl, tert-butyl, amyl, iso-amyl, cyclohexyl, phenyl, $CH_3C(O)CH_2$—, $C_2H_5OC(O)CH_2$—, $HOC(CH_3)_2CH_2$—, and

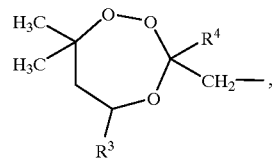

wherein $R^4$ is independently selected from any of the group of compounds given for $R^{1-3}$ in any one of claims 1 or 2, or

| Example | Peroxide used | Conversion (%) | | | | Mw * 10$^{-3}$ (D) | | | |
|---|---|---|---|---|---|---|---|---|---|
| | | 1.5 | 2 | 4 | 6 | 1.5 | 2 | 4 | 6 |
| 12 | Formula V | 75.5 | 84.3 | 97* | 98.8 | 195 | 202 | 200** | 195 |
| F | Trigonox ®22 | 77 | 79.6** | 90 | 97 | 176 | 180** | 192 | 193 |

\*= estimated from data after three hours (96%)
\*\*= estimated $R^1$ and $R^2$ are linked to form a substituted or unsubstituted cycloalkyl ring.

4. A process according to any one of claims 1–3 wherein a high-solid acrylate resin is formed.

5. A process according to any one of claims 1–3 wherein a styrenic resin is formed from a monomer mixture comprising at least 40% by weight of styrene.

6. A process according to any one of claims 1–3 wherein ethylene is radically polymerised or copolymerised at pressures from 500 to 4,000 bar.

7. A process according to claim 2 wherein $R^1$ and $R^3$ are selected from methyl, ethyl, and isopropyl.

* * * * *